United States Patent
Song

(10) Patent No.: US 10,214,920 B2
(45) Date of Patent: Feb. 26, 2019

(54) COMPOSITE EPOXY RESIN BOARD AND FORMING METHOD THEREOF

(71) Applicant: GUANGDONG OUMING NEW MATERIAL TECHNOLOGY CO.,LTD, Yangjiang,Guangdong (CN)

(72) Inventor: Dangji Song, Guangdong (CN)

(73) Assignee: GUANGDONG OUMING NEW MATERIAL TECHNOLOGY CO., LTD, Yandong, Guangdong (CN)

( * ) Notice: Subject to any disclaimer, the term of this patent is extended or adjusted under 35 U.S.C. 154(b) by 0 days.

(21) Appl. No.: 15/633,709

(22) Filed: Jun. 26, 2017

(65) Prior Publication Data

US 2017/0298639 A1    Oct. 19, 2017

(30) Foreign Application Priority Data

Jan. 5, 2017    (CN) .......................... 2017 1 0008279

(51) Int. Cl.

| | |
|---|---|
| E04F 15/10 | (2006.01) |
| B32B 27/08 | (2006.01) |
| B32B 5/20 | (2006.01) |
| B32B 27/38 | (2006.01) |
| B29C 43/00 | (2006.01) |
| B29B 17/04 | (2006.01) |
| E04F 15/22 | (2006.01) |
| B32B 5/18 | (2006.01) |
| B32B 7/12 | (2006.01) |
| B32B 9/00 | (2006.01) |
| B32B 9/04 | (2006.01) |
| B32B 21/08 | (2006.01) |
| B32B 21/14 | (2006.01) |
| B32B 25/08 | (2006.01) |
| B32B 27/06 | (2006.01) |
| B32B 27/10 | (2006.01) |
| B32B 27/18 | (2006.01) |
| B32B 27/30 | (2006.01) |
| B32B 27/32 | (2006.01) |
| B32B 27/40 | (2006.01) |
| B32B 27/42 | (2006.01) |
| B32B 29/06 | (2006.01) |
| B29K 63/00 | (2006.01) |
| B29K 105/26 | (2006.01) |
| B29L 31/00 | (2006.01) |
| B29C 43/24 | (2006.01) |

(52) U.S. Cl.
CPC ........ *E04F 15/107* (2013.01); *B29B 17/0404* (2013.01); *B29C 43/003* (2013.01); *B32B 5/18* (2013.01); *B32B 5/20* (2013.01); *B32B 7/12* (2013.01); *B32B 9/002* (2013.01); *B32B 9/045* (2013.01); *B32B 21/08* (2013.01); *B32B 21/14* (2013.01); *B32B 25/08* (2013.01); *B32B 27/065* (2013.01); *B32B 27/08* (2013.01); *B32B 27/10* (2013.01); *B32B 27/18* (2013.01); *B32B 27/304* (2013.01); *B32B 27/32* (2013.01); *B32B 27/38* (2013.01); *B32B 27/40* (2013.01); *B32B 27/42* (2013.01); *B32B 29/06* (2013.01); *E04F 15/102* (2013.01); *E04F 15/225* (2013.01); *B29C 43/24* (2013.01); *B29K 2063/00* (2013.01); *B29K 2105/26* (2013.01); *B29L 2031/732* (2013.01); *B32B 2250/04* (2013.01); *B32B 2264/104* (2013.01); *B32B 2264/105* (2013.01); *B32B 2272/00* (2013.01); *B32B 2305/70* (2013.01); *B32B 2307/536* (2013.01); *B32B 2307/54* (2013.01); *B32B 2307/546* (2013.01); *B32B 2307/558* (2013.01); *B32B 2471/00* (2013.01); *Y02W 30/625* (2015.05)

(58) Field of Classification Search
USPC ....................................................... 428/413
See application file for complete search history.

(56) References Cited

U.S. PATENT DOCUMENTS

| | | | |
|---|---|---|---|
| 2014/0186593 A1* | 7/2014 | Seo ...................... | H05K 1/0373 428/195.1 |
| 2015/0354143 A1* | 12/2015 | Pike ........................ | B32B 21/02 162/164.6 |

\* cited by examiner

*Primary Examiner* — Terressa Boykin

(57) ABSTRACT

A composite epoxy resin board, made from a raw material which includes the following weight percentage of components: waste prepreg powders of 5% to 100%, and waste printed circuit board (PCB) powders of 0% to 95%, is disclosed. The present invention adopts the waste prepregs as the main preparation raw material, which not only recycles and reuses prepreg scraps, but also reduces or even eliminates the use of adhesives due to the high epoxy resin content in the prepregs, while also reducing the glue-mixing time in the forming process, thereby simplifying the forming technology.

6 Claims, 1 Drawing Sheet

COMPOSITE EPOXY RESIN BOARD AND FORMING METHOD THEREOF

CROSS REFERENCE OF RELATED APPLICATION

The present invention claims priority under 35 U.S.C. 119(a-d) to CN 201710008279.1, filed Jan. 5, 2017.

BACKGROUND OF THE PRESENT INVENTION

Field of Invention

The present invention relates to the technical field of non-metallic composite materials, and more specifically to a composite epoxy resin board and its forming method.

Description of Related Arts

Based on the forming types, the boards can be divided into solid wood boards, fiberboards, particleboards, and so on. The laminate boards are formed through heating pressing process by using fiberboard or particle board as the core layer, laminating with one or more sheets of special paper impregnated with thermosetting amino resin, and adhering a wear-resistant layer on the top and a balance layer on the bottom. This type of laminate board has gained a tremendous market thanks to numerous desirable properties such as reasonable cost, stain resistance, wear resistance, and availability with many types of printed designs. However, the laminate boards have obvious shortcomings: sustained exposure to moisture will frequently destabilize the integrity or delamination of the fiberboards or particle boards, causing permanent and irreparable damage to the laminate boards. Meanwhile, excessive deforestation is becoming more severe due to the wide use of timber in solid wood and laminate boards. Currently, the price of wooden products is increasing day by day, limiting the development of wooden decorative materials.

On the other hand, with the continuous development of industrial production, energy/emissions reduction, environmental protection, and other issues are gaining global attention. The disposal of industrial wastes, such as scraps or powders from production of prepregs (PP film), bakelite, Printed Circuit Boards (PCBs), stone products, PVC, PE, and HDPE, have become an urgent problem.

The patent CN102686667B discusses a waterproof, fire-resistant and zero-carbon eco-board made using the powdered waste of printed circuit boards (PCBs), and its manufacturing process. The raw material that is made into this board comprises the following: 70-to-90% powder from waste Printed Circuit Boards, 7-to-12% phenolic resin, and 3-to-22% of chemical fiber. Although the patent provides the solution for the use of recycled PCB wastes, the phenolic resin must be added as an adhesive to provide the board with sufficient strength.

SUMMARY OF THE PRESENT INVENTION

The main goal of the present invention is to provide a composite epoxy resin board intended to solve the problem that the conventional boards can be distorted or have poor properties when exposed to moisture, while also simplifying the complicated manufacturing process of forming such boards using the powder waste of Printed Circuit Boards (PCBs).

To achieve this goal, the present invention provides a composite epoxy resin board made from a raw material comprising following weight component percentage: waste prepreg powders 5% to 100%, and waste printed circuit board (PCB) powders 0% to 95%.

Preferably, the raw material which is made into the composite epoxy resin board further comprises 1% to 90% by weight epoxy plastic product waste powders or phenolic plastic product waste powders, wherein the sum of the percentages of all components of the raw material is 100%.

Preferably, the raw material, which is made into the composite epoxy resin board, further comprises 1% to 80% of stone powders by weight, wherein the sum of the percentages of all components of the raw material is 100%; and the stone powders are made from wastes which are produced from marble mining or processing.

Preferably, the raw material, which is made into the composite epoxy resin board, further comprises 1% to 45% by weight PVC powders and/or PE powders and/or HDPE powders, wherein the sum of the percentages of all components of the raw material is 100%.

Preferably, the raw material, which is made into the composite epoxy resin board, further comprises 1% to 80% by weight straw, bamboo and wood powders, wherein the sum of the percentages of all components of the raw material is 100%; and the straw, bamboo and wood powders are one or more members selected from a group consisting of straw powders, wood sawdust and bamboo sawdust.

Preferably, the raw material, which is made into the composite epoxy resin board, further comprises 1% to 20% chemical fiber powders by weight, wherein the sum of the percentages of all components of the raw material is 100%.

Preferably, the raw material, which is made into the composite epoxy resin board, further comprises 1% to 80% calcium carbonate powders by weight, wherein the sum of the percentages of all components of the raw material is 100%.

Preferably, the raw material, which is made into the composite epoxy resin board, further comprises 0.01% to 20% copper powders by weight, wherein the sum of the percentages of all components of the raw material is 100%.

Preferably, the raw material, which is made into the composite epoxy resin board, further comprises 0.01% to 20% aluminum powders by weight, wherein the sum of the percentages of all components of the raw material is 100%.

Preferably, the raw material, which is made into the composite epoxy resin board, further comprises 1% to 20% adhesives by weight, wherein the sum of the percentages of all components of the raw material is 100%, and the adhesives are one or more members selected from a group consisting of phenolic-resin adhesives, epoxy resin adhesives, isocyanate adhesives and polyvinyl alcohol adhesives.

Preferably, the raw material, which is made into the composite epoxy resin board, further comprises 1% to 10% additives by weight, wherein the sum of the percentages of all components of the raw material is 100%, and the additives are one or more members selected from a group consisting of color pigments, lubricants, anti-ultraviolet agents, antioxidants, reinforcing agents, carbide stabilizers, mildew inhibitors and coupling agents.

Preferably, the raw material, which is made into the composite epoxy resin board, comprises following components by weight: 5% to 95% of waste prepreg powders, 1% to 95% of powders from waste Printed circuit boards (PCBs), 1% to 90% of powders from waste epoxy plastic products or phenolic plastic products, 0% to 80% of stone powders, 0% to 45% of PVC powders and/or PE powders and/or HDPE powders, 0% to 20% of copper powders, 0% to 20% of aluminum powders, 0% to 5% of color pigments, 0%-80% of straw, bamboo and wood powders, 0% to 20% of chemical fiber powders, 0% to 80% of calcium carbonate powders, 0% to 20% of adhesives, 0% to 1% of antioxidants, 0% to 1% of reinforcing agents, 0% to 1% of carbide stabilizers, and 0% to 5% of coupling agents, wherein the sum of the percentages of all components of the raw material is 100%.

Preferably, the raw material, which is made into the composite epoxy resin board, comprises following components by weight: 5% to 80% of waste prepreg powders, 1% to 70% of powders from waste Printed circuit boards (PCBs), 1% to 70% of powders from waste epoxy plastic products or phenolic plastic products, 1% to 50% of stone powders, 1% to 45% of PVC powders and/or PE powders and/or HDPE powders, 0.01% to 1% of copper powders, 0.01% to 1% of aluminum powders, 0.01% to 1% of color pigments, 1% to 40% of straw, bamboo and wood powders, 1% to 20% of chemical fiber powders, 1% to 10% of calcium carbonate powders, 1% to 10% of adhesives, 0% to 1% of antioxidants, 0% to 1% of reinforcing agents, 0% to 1% of carbide stabilizers, and 0% to 1% of coupling agents, wherein the sum of the percentages of all components of the raw material is 100%.

Also, the present invention provides a forming method of a composite epoxy resin board, which comprises steps of:

(S1) evenly blending and stirring the raw material as defined in any one of preceding descriptions;

(S2) pressing and forming a panel, which comprises steps of:

(S2-1) pre-pressing after feeding the stirred raw material in above step (S1) into a forming station, obtaining a matt, sending the obtained matt into a press, and then pressing and forming the panel; or (S2-2) feeding the blended raw material from step (S1) into an extruder, and then extruding and forming the panel; or (S2-3) heating and banbury blending after feeding the blended raw material in step (S1) into an internal mixer, then into a calender to press and form the panel; and (S3) edge-trimming after pulling out multiple formed panels manufactured in step (S2), and then stacking, cooling, and keeping the multiple formed panels in good shape.

Preferably, a preparation method of the waste prepreg powders comprises: crushing and grinding recycled scraps from production of prepregs, and then extracting metals to obtain the waste prepreg powders.

A preparation method of the powders from waste Printed circuit boards (PCBs) comprises: crushing and grinding scraps from Printed circuit boards (PCBs) and recycled Printed circuit boards (PCBs), and then extracting metals to get the powders.

A preparation method of waste powders from the epoxy plastic product or phenolic plastic product comprises: crushing and grinding recycled epoxy plastic products or phenolic plastic products, and scraps from production of epoxy plastic products or phenolic plastic products, and then extracting metals to obtain waste powders.

Preferably, in step (S2-1), feeding the obtained matt into the press, and then pressing and forming the panel, is done as follows:

through the carrier of steel, aluminum or epoxy resin plate, feeding the obtained matt into the hot press for pressurizing, which is circularly heated by the heat transfer oil, maintaining the heating temperature between 100° C. and 250° C.; and then synchronously closing and pressurizing the press for 0.5 minutes to one minute, and then pausing for one minute to three minutes; and then secondarily pressing twice for 4 minutes to 90 minutes, and then exhausting and relieving pressure.

Preferably, the forming method of the composite epoxy resin board further comprises a step during (S4) involving sanding, inspecting, cleaning and storing the panels after the step (S3) edge-trimming, after pulling out the formed panels, then stacking, cooling and keeping the panels in good shape.

Also, the present invention provides a composite epoxy resin floor or decorative board, comprising an inner core adhered to a top decoration layer and a bottom balance layer, wherein the inner core is any option of the composite epoxy resin boards mentioned above.

Compared with prior arts, beneficial effects of the technical solution provided by the present invention are as follows.

1. The composite epoxy resin board provided by the present invention is mainly made from waste prepreg powders and waste printed circuit board (PCB) powders. The waste prepreg powders are derived from the scraps generated in the production of prepregs, therefore recycling the prepreg waste; while the waste printed circuit board (PCB) powders are derived from the scraps generated in the production of printed circuit boards (PCBs), therefore recycling and reusing of PCB wastes; both provide solutions for handling enormous industrial wastes.

2. The composite epoxy resin board provided by the present invention is also made from waste powders from epoxy plastic products or phenolic plastic products. The waste powders are derived from thermosetting plastic wastes, including scraps or grinding powers, generated by shipyards, epoxy-resin model factories, aerospace factories, automobile factories, sporting goods factories, and electrical and electronic factories. With this solution, wastes from any kind of epoxy plastic products or phenolic plastic products can be recycled and reused.

3. Since the prepregs are primarily made from epoxy resin and glass fiber cloth or fiberglass mesh, with the epoxy resin accounting for 20% to 80%, the semi-cured epoxy resin has excellent bonding strength; it melts when heated and blended with other parts to form a good adhesion, thus replacing the adhesives. By using prepreg wastes in board production, the amount of adhesive can be reduced or even eliminated.

4. Waste printed circuit board (PCB) powders primarily contain epoxy resin and glass fiber, while the powders from phenolic waste powders contain primarily phenolic resin. By using epoxy resin, phenolic resin and glass fiber, the manufactured board has not only higher strength and toughness, but also excellent performance in terms of heat resistance, insulation, chemical stability, dimensional stability, and corrosion resistance.

5. In the present invention, the stone powders are also used as the auxiliary materials, thus enabling the recycling and reuse of the waste materials produced by marble mining or processing. Using the stone powders as raw materials to increase the volume of the product (with their high density) not only lowers the cost of the boards, it also increases the rigidity of the boards; with shrinkage reduced; and mechanical properties improved, leading to increased hardness and specific modulus for the board.

6. In the present invention, PVC, PE and HDPE thermoplastics can be added to increase the mechanical strength and dielectric properties of the board, and facilitate the board formation process.

7. In the present invention, calcium carbonate powders are used as the filler, which can not only increase the product volume, reduce the production cost, reinforce or stiffen, and increase the dimensional stability of the board.

8. In the present invention, copper or aluminum powders are also used as filler added to the raw material; both have good thermal conductivity that improves the heat radiation performance of the boards.

9. In the present invention, a variety of additives are used in the raw material to improve the performance of the board, such as antioxidants to inhibit the board aging during processing or application, reinforcing agents to improve resin dispersion and mobility, carbide stabilizers to prevent or inhibit board aging, lubricants to reduce friction between powder particles during the pressing process, thus facilitating stripping.

These and other objectives, features, and advantages of the present invention will become apparent from the following detailed description, the accompanying drawings, and the appended claims.

BRIEF DESCRIPTION OF THE DRAWINGS

To more clearly illustrate the embodiments of the present invention or the technical solutions in the prior art, the following drawings, which are to be used in the description of the embodiments or the prior art, will be briefly described. It will be apparent that the drawings in the following description are merely some embodiments of the present invention, and for the benefit of one skilled in the art, other drawings may be obtained from the structures shown in these figures without paying creative work.

DETAILED DESCRIPTION OF THE PREFERRED EMBODIMENT

Figure 1:
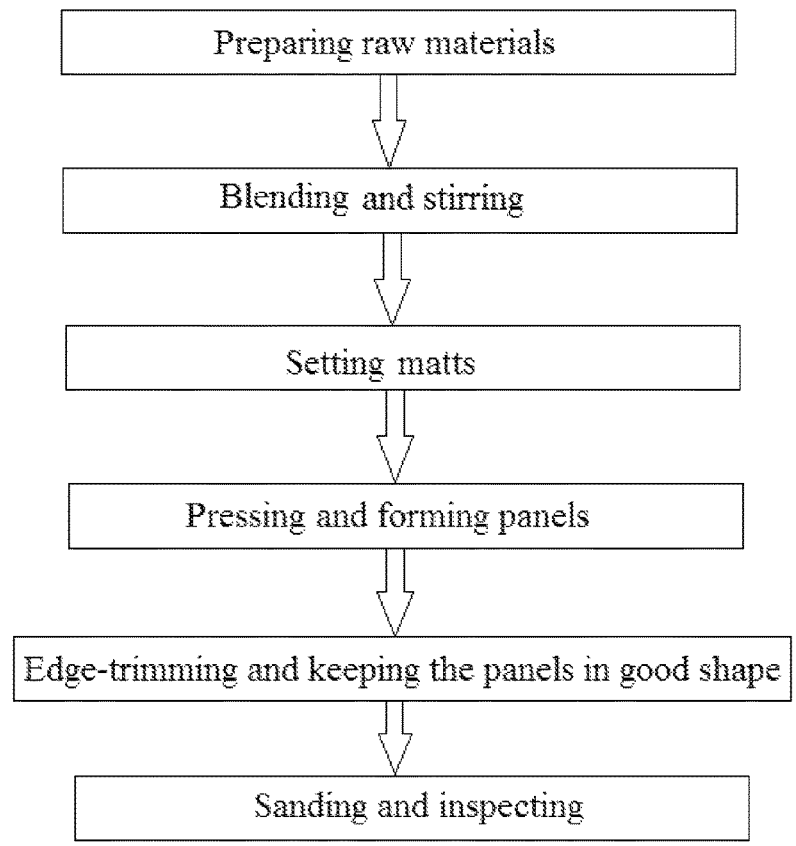
FIG. 1 is a process flow diagram of a forming method for a composite epoxy resin board as described in one of the preferred embodiments of the present invention.

Specific embodiments of the present invention will be described in further detail with reference to the accompanying drawings. Descriptions of these embodiments are intended to aid the understanding of the present invention, but not construed as limiting the present invention. In addition, the technical features described in the various embodiments of the present invention, described below, can be combined with each other, as long as they do not conflict with each other.

The present invention provides a composite epoxy resin board made from a raw material comprising the following components by weight: 5% to 100% waste prepreg powders, and 0% to 95% waste powders from printed circuit boards (PCBs).

Preferably, the raw material, which is made into the composite epoxy resin board, further comprises 1% to 90% of waste powders from epoxy plastic products or phenolic plastic products by weight, wherein the sum of the percentages of all components of the raw material is 100%.

The waste prepreg powders in the present invention refer to the material powders made from recycling edge and corner materials from cutting of the prepregs by prepreg manufacturers and printed circuit board (PCB) manufacturers, material powders made from expired inventory prepreg scraps, or a mixture of two or three of the above-mentioned material powers in any proportion. The powders from waste printed circuit boards (PCBs) refer to the non-metallic material powders derived from the processes of crushing, grinding and metal-extracting of edge and corner scraps from production of printed circuit boards (PCBs), abandoned single-sided circuit boards, double-sided circuit boards, multilayer circuit boards, CCL (copper-clad laminate) from expired inventory, or a mixture of two or more of the above-mentioned recycled powers in any proportion.

The waste powders from epoxy plastic products or phenolic plastic products refer to the material powders made from recycled epoxy or phenolic plastic products, which comprise: scrap cutting or grinding powers generated by shipyard construction using fiber reinforced resin as structural or functional materials; scrap and waste powders from producing and repairing clothing model props by epoxy-resin model factories; scrap and waste powders from epoxy resin or phenolic resin composite materials used in the production of light aircraft structural parts, satellite antennas, bullet-proof panels, rocket nozzles and other parts; scrap and waste powders from fiber-reinforced phenolic plastic or epoxy plastic materials used in manufacturing of automobile bodies, hoods, or bumpers and other auto parts by car manufactures; scrap and waste powders from epoxy plastic or phenolic resin plastic materials used in the production of snowboarding gear, golf clubs, tennis rackets, and other epoxy plastic or phenolic resin plastic sporting goods by sporting goods factories; wastes and grinding powders created during the manufacturing of bearings, fan blades, power tool shells, and other electrical structural materials or electrical insulation materials by electric and electronic factories.

The composite epoxy resin board provided by the present invention is made primarily from waste prepreg powders and waste printed circuit board (PCB) powders. The waste prepreg powders are derived from the scraps generated in the production of prepregs, thereby recycling prepreg waste, while the waste printed circuit board (PCB) powders are derived from the scraps generated in the production of printed circuit boards (PCBs), thereby recycling and reusing PCB wastes. Both provide solutions for handling enormous amounts of industrial waste.

The composite epoxy resin board provided by the present invention is also made from waste powders from epoxy plastic products or phenolic plastic products. The waste powders are derived from thermosetting plastic wastes, including scraps or grinding powers, generated by shipyards, epoxy-resin model factories, aerospace factories, automobile factories, sporting goods factories, and electrical and electronic factories. With this solution, wastes from any kind of epoxy plastic products or phenolic plastic products can be recycled and reused.

Since the prepregs are made primarily from epoxy resin and glass fiber cloth or fiberglass mesh, and the epoxy resin composition of which accounts for 20% to 80%, the semi-cured epoxy resin has excellent bonding strength; it melts when heated and blended with other parts to form a good adhesion, thus replacing adhesives. By using prepreg waste in board production, the amount of adhesive can be reduced, or even eliminated.

The powders from waste printed circuit boards (PCBs) primarily contain epoxy resin and glass fiber; the powders from phenolic resin wastes mainly contain phenolic resin. By using epoxy resin, phenolic resin and glass fiber, the manufactured board has not only higher strength and toughness, but also excellent performance in terms of heat resistance, insulation, chemical stability, dimensional stability and corrosion resistance.

Preferably, the raw material, which is made into the composite epoxy resin board, further comprises 1% to 80% stone powders by weight, wherein the sum of the percentages of all the components of the raw material is 100%. The stone powders are made from wastes from marble mining or processing.

In the present invention, the stone powders are also used as the auxiliary materials, thus recycling and reusing the waste materials produced by marble mining or processing. By using the stone powders as raw materials to increase the volume of the product, with their high density, not only does the cost of the board decrease, the rigidity of the boards improve, with the shrinkage reduced, and the mechanical properties improved, thus increasing the hardness and specific modulus of the board.

Preferably, the raw material, which is made into the composite epoxy resin board, further comprises 1% to 45% by weight PVC powders and/or PE powders and/or HDPE powders, wherein the sum of the percentages of all the components of the raw material is 100%.

The PVC powders and/or PE powders and/or HDPE powders are one or more members selected from a group consisting of PVC powders, PE powders and HDPE powders.

The PVC powders can be new, or made from recycled PVC waste plastics; the PE powders can be new, or made from recycled waste PE plastics; the HDPE powders can be new, or made from recycled waste HDPE plastics; all PVC, PE and HDPE materials are thermoplastic plastics, able to improve the mechanical strength and dielectrical properties of the board; the PVC powders, PE powders and HDPE powders are added as raw material, which makes the board formation process easier.

Preferably, the raw material, which is made into the composite epoxy resin board, further comprises 1% to 80% by weight straw, bamboo and wood powders, wherein the sum of the percentages of all the components of the raw material is 100%. The straw, bamboo and wood powders are one or more members selected from a group consisting of straw powders, wood sawdust, and bamboo sawdust.

The straw, bamboo and wood powders are dried to control the moisture content, in a range of 4%-10%. The use of straw, bamboo and wood powders thus recycle and utilize crop straw, wood saw powder, and bamboo saw powder; the plant fibers, wood fibers and bamboo fibers can improve the water absorption, shrinkage resistance, and compressive strength of the board.

Preferably, the raw material, which is made into the composite epoxy resin board, further comprises 1% to 20% chemical fiber powders by weight, wherein the sum of the percentages of all the components of the raw material is 100%.

The chemical fiber powders are added for improving not only the tensile strength and elasticity of the board, but also the heat resistance and abrasion of the board; while reducing the usage of adhesives.

Preferably, the raw material, which is made into the composite epoxy resin board, further comprises 1% to 80% calcium carbonate powders by weight, wherein the sum of the percentages of all the components of the raw material is 100%.

The calcium carbonate powders are used as the filler, which can not only increase the volume of the product, reduce the production cost, but also play the reinforcing or stiffening effect and increase the dimensional stability of the board.

Preferably, the raw material, which is made into the composite epoxy resin board, further comprises 0.01% to 20% copper powders by weight, wherein the sum of the percentages of all the components of the raw material is 100%.

The copper powders are used to improve the thermal conductivity of the board and enable the board to be adapted for producing geothermal floors.

Preferably, the raw material, which is made into the composite epoxy resin board, further comprises 0.01% to 20% aluminum powders by weight, wherein the sum of the percentages of all the components of the raw material is 100%.

The aluminum powders are used for improving the fire retardant performance of the board.

Preferably, the raw material, which is made into the composite epoxy resin board, further comprises 1% to 20% adhesives by weight, wherein the sum of the percentages of all the components of the raw material is 100%, and these adhesives are one or more members selected from a group consisting of phenolic-resin adhesives, epoxy resin adhesives, isocyanate adhesives and polyvinyl alcohol adhesives.

Based on applications in special circumstances, the adhesives can be appropriately added to improve the strength of the board.

Preferably, the raw material, which is made into the composite epoxy resin board, further comprises 1% to 10% additives by weight, wherein the sum of the percentages of all the components of the raw material is 100%, and the additive is one or more members selected from a group consisting of color pigments, lubricants, anti-ultraviolet agents, antioxidants, reinforcing agents, carbide stabilizers, mildew inhibitors, and coupling agents.

The color pigments are used to adjust the color of the board. The anti-ultraviolet agents, antioxidants, reinforcing agents, carbide stabilizers, and coupling agents are added according to the application circumstances or the special usage of the product.

Preferably, the raw material, which is made into the composite epoxy resin board, comprises the following components by weight: 5% to 95% waste prepreg powders, 1% to 95% powders from waste printed circuit boards (PCBs), 1% to 90% powders from waste epoxy plastic products or phenolic plastic products, 0% to 80% stone powders, 0% to 45% PVC powders and/or PE powders and/or HDPE powders, 0% to 20% copper powders, 0% to 20% aluminum powders, 0% to 5% color pigments, 0% to 80% straw, bamboo, and wood powders, 0% to 20% chemical fiber powders, 0% to 80% calcium carbonate powders, 0% to 20% adhesives, 0% to 1% antioxidants, 0% to 1% reinforcing agents, 0% to 1% carbide stabilizers, and 0% to 5% coupling agents, wherein the sum of the percentages of all the components of the raw material is 100%.

Preferably, the raw material, which is made into the composite epoxy resin board, comprises the following components by weight: 5% to 80% waste prepreg powders, 1% to 70% powders from waste printed circuit boards (PCBs), 1% to 70% powders from waste epoxy plastic products or phenolic plastic products, 1% to 50% stone powders, 1% to 45% PVC powders and/or PE powders and/or HDPE powders, 0.01% to 1% copper powders, 0.01% to 1% aluminum powders, 0.01% to 1% color pigments, 1% to 40% straw, bamboo, and wood powders, 1% to 20% chemical fiber powders, 1% to 10% calcium carbonate powders, 1% to 10% adhesives, 0% to 1% antioxidants, 0% to 1% reinforcing agents, 0% to 1% carbide stabilizers, and 0% to 1% coupling agents, wherein the sum of the percentages of all the components of the raw material is 100%.

FIG. 1 is a process flow diagram of a forming method for a composite epoxy resin board as described in one of the preferred embodiments in the present invention.

Referring to FIG. 1, the present invention provides a forming method of a composite epoxy resin board, which comprises steps as follows:

(S1) Evenly blending and stirring the raw material as defined in any one of preceding descriptions.

A preparation method for waste prepreg powders comprises: crushing and grinding recycled scraps from production of prepregs, and then extracting metals to obtain the waste prepreg powders.

A preparation method for powders from waste printed circuit boards (PCBs) comprises: crushing and grinding scraps from printed circuit boards (PCBs) and recycled printed circuit boards (PCBs), and then extracting of metals to get the powders.

A preparation method for waste powders from epoxy plastic products or phenolic plastic products comprises: crushing and grinding recycled epoxy plastic products or phenolic plastic products, and scraps from production of epoxy plastic products or phenolic plastic products, and then extracting metals to obtain waste powders.

Generally, manufactured prepregs contain 20% to 80% prepreg epoxy resin by weight, and preferably the prepregs contain 48% to 80% prepreg epoxy resin by weight. The waste powders from epoxy plastic products or phenolic plastic products contain 40% to 80% thermosetting phenolic resin by weight. In the manufacturing process, the weight proportion of the waste powders to be added can be adjusted according to different waste sources of epoxy plastic products or phenolic plastic products.

(S2) Pressing and forming a panel comprises:

(S2-1) Laying up the raw material evenly on the forming station to form into a mattress, setting up a certain thickness (1 mm to 30 mm as required), setting up a certain density (800 kg/m$^3$ to 2200 kg/m$^3$), a certain width (600 mm to 2440 mm), a certain length (800 mm to 4880 mm), and then pre-pressing to obtain a matt. Through a steel, aluminum, or epoxy resin plate, feed the obtained matt into the hot press for pressurizing, which is circularly heated by the heat transfer oil, maintaining the heating temperature between 100° C. and 250° C. The press synchronously closes and pressurizes for 0.5 to one minute; pausing for one to three minutes, with two secondary pressings for 4 to 90 minutes, and then exhausting and relieving the pressure, with the panel then formed. The press can be a single-layer or multi-layer press, with selection of tonnage between 1,000 to 5,000 tons. Each layer of a multi-layer press can control 1 to 3 matts, and simultaneously press with the matts all loaded. Continuous press is also an option, with selection of tonnage between 1,000 to 5,000 tons; or (S2-2) Feeding the blended raw materials in the step (S1) into an extruder to be extruded for forming the panel; or (S2-3) Heating and banbury blending after feeding the stirred raw material in the step (S1) into an internal mixer, then into a calender to press and form the panel.

(S3) Edge-trimming after pulling out multiple formed panels, and then stacking and keeping the multiple formed panels in good shape.

Preferably, the edge-trimming comprises horizontal trimming and vertical trimming; the board is then cut into a rectangular shape.

(S4) Sanding, inspecting, cleaning and storing the panels.

Preferably, the sanding is adapted for smoothing the surface of the boards, with inspection then carried out to check for damage and surface smoothness, with the boards then cleaned and packaged.

The present invention employs waste prepregs as the main preparation raw material, which reduces or even replaces the use of the adhesives. Without adding or blending the adhesives, while just mixing and stirring evenly various raw materials, the production process is simplified, the production efficiency is improved, and the panels produced have good dimensional stability and excellent bond strength.

Figure 2:
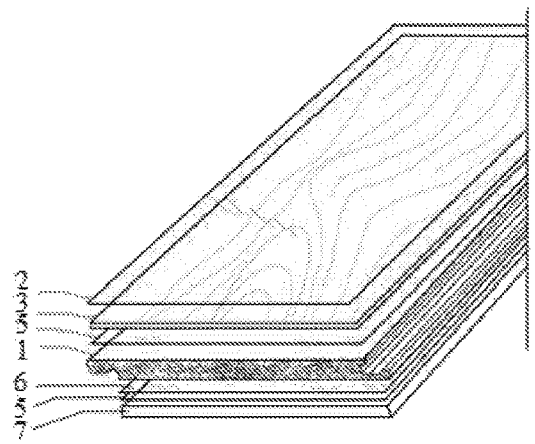
FIG. 2 is a structurally schematic view of a composite epoxy resin floor or decorative board as described in one of the preferred embodiments of the present invention.

FIG. 2 is a structural schematic view of a composite epoxy resin floor or decorative board as described in one of the preferred embodiments in the present invention.

Referring to FIG. 2, the present invention provides a composite epoxy resin floor or decorative board comprising an inner core 1, bonded with a surface decorative layer 3 and a balance layer 6 on the other side, wherein the inner core is any of the composite epoxy resin board options mentioned above.

The inner core layer is laminated with a decorative layer 3 on the top, which is adhered to a further wear layer 2, and a balance layer 6 on the bottom, which is attached with an underlayment layer 7; wherein the decorative layer 3 is adhered to the inner core layer with a bonding layer 5, while the underlayment layer 7 is attached to the balance layer 6 with another bonding layer 5. The wear layer 2 is a cover layer, selected from a group consisting of melamine resin with aluminum oxide and polyurethane, or UV coating. The bonding layer 5 is a PU adhesive, an epoxy resin, a hot melt adhesive, or a water-resistant adhesive. The PU adhesive is water resistant, which prevents the board from swelling when exposed to moisture. The balance layer 6 is a stabilizing layer which provides a protective barrier against the stress and tension from the decorative layer 3 and wear layer 2; and creates equality on either side of the core layer 1 to protect the board from warping; the mechanical property of the boards is improved thereof. The underlayment layer 7 is selected from a variety of possible materials such as cork, rubber and foam, which creates foot comfort. The decorative layer 3 is selected from a group consisting of wood veneer, melamine paper or HPL, stone veneer, tile veneer, rubber, decorative plastic veneer, linoleum veneer and decorative vinyl veneer.

Specifically, a composite epoxy resin floor or decorative board comprises:

a veneer layer, a first adhesive layer, an inner core, a second adhesive layer and a cover layer, wherein:

the veneer layer is adhered to a top surface of the inner core, and is selected from a group consisting of wood veneer, melamine paper or HPL, stone veneer, tile veneer, rubber, decorative plastic veneer, linoleum veneer and decorative vinyl veneer;

the first adhesive layer is adapted for bonding the veneer layer to the top surface of the inner core, and is selected from PU adhesive, epoxy resin, a hot melt adhesive, and a water-resistant adhesive;

the inner core is a composite epoxy resin board made from the raw material as defined in any one of preceding descriptions;

the second adhesive layer is adapted for bonding an underlayer to a bottom surface of the inner core, the second adhesive is selected from the PU adhesive, the epoxy resin, the hot melt adhesive, and the water-resistant adhesive; the underlayer is selected from a group consisting of cork, rubber, foam and balance paper;

the cover layer is further laminated over the veneer layer, and the cover layer is selected from a group consisting of melamine resin with aluminum oxide and polyurethane, vinyl and UV coating.

After repeated tests, the following raw material formula (Table 1) is obtained to meet the production needs, wherein the values (except the first column and the first line) refer to the weight percentage.

dants, number 17 denotes reinforcing agents, number 18 denotes carbide stabilizers, and number 19 denotes coupling agents.

The performance of the composite epoxy resin boards produced with the above raw material proportions can reach the below parameters, taking the testing result of the board in size 1220 mm (W)×2440 mm (L)×12 mm (TH) as an example.

TABLE 1

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| E1 | 90 | 10 | | | | | | | | | | | | | | | | | |
| E2 | 10 | 90 | | | | | | | | | | | | | | | | | |
| E3 | 80 | 10 | 9 | | | | 0.1 | 0.1 | 0.8 | | | | | | | | | | |
| E4 | 53 | | | | 45 | 1 | | | 1 | | | | | | | | | | |
| E5 | 60 | | | | | | 9 | | 1 | 30 | | | | | | | | | |
| E6 | 40 | 39 | | | | 10 | | | 1 | | | 10 | | | | | | | |
| E7 | 30 | 30 | 30 | | 8 | | 1 | 1 | | | | | | | | | | | |
| E8 | 20 | | 50 | | 17 | 5 | | | 1 | | | | 7 | | | | | | |
| E9 | 10 | 20 | 50 | | | | 1 | 1 | 1 | | | | | 17 | | | | | |
| E10 | 10 | 32 | 5 | | 45 | | 1 | 1 | 1 | | | | | 5 | | | | | |
| E11 | 20 | | 10 | 40 | | 10 | | | | | | | | 20 | | | | | |
| E12 | 36 | 40 | 20 | | | | 1 | 1 | 1 | | | | | | | 1 | | | |
| E13 | 40 | | 30 | 20 | | 8 | | | 1 | | | | | | 1 | | | | |
| E14 | 9 | 40 | | | | | | | 1 | 40 | | | 10 | | | | | | |
| E15 | 24 | 50 | | | 10 | | | | 1 | | | 10 | 5 | | | | | | |
| E16 | 20 | 10 | 60 | | | | | | 1 | | | | | 9 | | | | | |
| E17 | 5 | 70 | | | 3 | 2 | | | | | | | | 20 | | | | | |
| E18 | 10 | 80 | | | | 2 | | | 1 | | | | 6 | | | | 1 | | |
| E19 | 10 | 10 | 46 | 30 | | 3 | | | 1 | | | | | | | | | | |
| E20 | 50 | | 50 | | | | | | | | | | | | | | | | |
| E21 | 10 | 70 | 10 | | | | | | | | | 10 | | | | | | | |
| E22 | 10 | 60 | | | 29 | | | | 1 | | | | | | | | | | |
| E23 | 20 | 50 | | | | 7 | 1 | 1 | 1 | | | 20 | | | | | | | |
| E24 | 30 | 40 | | | 30 | | | | | | | | | | | | | | |
| E25 | 10 | 30 | | 50 | | | | | | | | 10 | | | | | | | |
| E26 | 10 | 20 | | | 35 | 30 | | | | | | | | | | | | 5 | |
| E27 | 20 | | | 60 | | | | | | | | | | | 20 | | | | |
| E28 | 30 | | | | | 50 | | | | 10 | 10 | | | | | | | | |
| E29 | 40 | | | | 20 | | | | | 30 | | 10 | | | | | | | |
| E30 | 60 | | | 30 | | | | | | | | | 3 | 7 | | | | | |
| E31 | 70 | | | 10 | 20 | | | | | | | | | | | | | | |
| E32 | 80 | | | | | | | | | 20 | | | | | | | | | |
| E33 | 90 | | | | | | | | | | 10 | | | | | | | | |
| E34 | 20 | | | | | | | | | 40 | 40 | | | | | | | | |
| E35 | 30 | | | | | | | | | 30 | 30 | 10 | | | | | | | |
| E36 | 20 | 49 | | | | 10 | | | 1 | 10 | 10 | | | | | | | | |
| E37 | 10 | 60 | | | 20 | | 0.01 | 0.01 | 0.98 | | | | 4 | | | | | 5 | |
| E38 | 95 | 5 | | | | | | | | | | | | | | | | | |
| E39 | 80 | | | | | 20 | | | | | | | | | | | | | |
| E40 | 70 | 10 | | | | | | 20 | | | | | | | | | | | |
| E41 | 5 | 95 | | | | | | | | | | | | | | | | | |
| E42 | 20 | | | | 80 | | | | | | | | | | | | | | |
| E43 | 20 | | | | | 80 | | | | | | | | | | | | | |
| E44 | 80 | 5 | 5 | | | | | | 5 | | | | | 5 | | | | | |

In the first column, E1 denotes experiment 1, E2 denotes experiment 2, E3 denotes experiment 3, and so on; in the first line, number 1 denotes waste prepreg powders, number 2 denotes waste electronic circuit board (PCB) powders, number 3 denotes epoxy plastic product waste powders or phenolic plastic product waste powders, number 4 denotes stone powders, number 5 denotes PVC powders and/or PE powders and/or HDPE powders, number 6 denotes calcium carbonate powders, number 7 denotes copper powders, number 8 denotes aluminum powders, number 9 denotes color pigments, number 10 denotes straw powders, number 11 denotes wood bamboo powders, number 12 denotes chemical fiber powders, number 13 denotes phenolic resin adhesive, number 14 denotes epoxy resin adhesive, number 15 denotes isocyanate adhesive, number 16 denotes antioxi-

| Test Item | Test Result |
|---|---|
| Rockwell hardness (HRC) | 105 |
| Flexural Strength (MPa) | 30 |
| Modulus of Elasticity in Flexure (GPa) | 6 |
| Tensile Strength at Break (MPa) | 17 |
| Charpy Impact Strength (kj/m²) | 3.2 (C) |
| Compressive strength (MPa) | 110 |
| Formaldehyde release (mg/L) | 0.3 |

From above, it can be concluded that the Flexural Strength of the composite epoxy resin board can reach 30 MPa and the Modulus of Elasticity in Flexure can reach 6 GPa. Comparing with conventional high density fiber boards (HDF) with Flexural Strength of 25 MPa to 27 MPa and Modulus of Elasticity 4 GPa to 4.5 GPa, the composite epoxy resin board strength provided by the present invention is greatly improved and not easily deformed.

Numerous alterations of the structure herein disclosed will suggest themselves to those skilled in the art. However, it is to be understood that the present disclosure relates to the preferred embodiment of the invention, for the purposes of illustration only and not to be construed as a limitation of the invention. All modifications such as the equivalent structural transformation, directly or indirectly using of the present specification and the accompanying drawings, which do not depart from the spirit of the invention, are intended to be included within the scope of the appended claims.

What is claimed is:

1. A composite epoxy resin board made from a raw material comprising following components by weight: 5% to 95% waste prepreg powders, 1% to 95% powders from waste printed circuit boards (PCBs), 1% to 90% powders from waste epoxy plastic products or phenolic plastic products, 0% to 80% stone powders, 0% to 45% PVC powders and/or PE powders and/or HDPE powders, 0% to 20% copper powders, 0% to 20% aluminum powders, 0% to 5% color pigments, 0% to 80% straw, bamboo and wood powders, 0% to 20% chemical fiber powders, 0% to 80% calcium carbonate powders, 0% to 20% adhesives, 0% to 1% antioxidants, 0% to 1% reinforcing agents, 0% to 1% carbide stabilizers, and 0% to 5% coupling agents, and a sum of which is 100%, wherein:

the stone powders are made from wastes produced from marble mining or processing;

the straw, bamboo and wood powders are one or more members selected from a group consisting of straw powders, wood sawdust and bamboo sawdust;

the adhesives are one or more members selected from a group consisting of phenolic-resin adhesives, epoxy resin adhesives, isocyanate adhesives and polyvinyl alcohol adhesives.

2. The composite epoxy resin board, as recited in claim 1, wherein the raw material made into the composite epoxy resin board comprises the following components by weight: 5% to 80% waste prepreg powders, 1% to 70% powders from waste printed circuit boards (PCBs), 1% to 70% powders from waste epoxy plastic products or phenolic plastic products, 1% to 50% stone powders, 1% to 45% PVC powders and/or PE powders and/or HDPE powders, 0.01% to 1% copper powders, 0.01% to 1% aluminum powders, 0.01% to 1% color pigments, 1% to 40% straw, bamboo and wood powders, 1% to 20% chemical fiber powders, 1% to 10% calcium carbonate powders, 1% to 10% adhesives, 0% to 1% antioxidants, 0% to 1% reinforcing agents, 0% to 1% carbide stabilizers, and 0% to 1% coupling agents, and a sum of which is 100%.

3. A forming method of a composite epoxy resin board, which comprises steps of:

(S1) evenly blending and stirring a raw material made into the composite epoxy resin board which comprises following components by weight: 5% to 95% waste prepreg powders, 1% to 95% powders from waste printed circuit boards (PCBs), 1% to 90% powders from waste epoxy plastic products or phenolic plastic products, 0% to 80% stone powders, 0% to 45% PVC powders and/or PE powders and/or HDPE powders, 0% to 20% copper powders, 0% to 20% aluminum powders, 0% to 5% color pigments, 0% to 80% straw, bamboo and wood powders, 0% to 20% chemical fiber powders, 0% to 80% calcium carbonate powders, 0% to 20% adhesives, 0% to 1% antioxidants, 0% to 1% reinforcing agents, 0% to 1% carbide stabilizers, and 0% to 5% coupling agents, and a sum of which is 100%, wherein the stone powders are made from wastes produced from marble mining or processing; the straw, bamboo and wood powders are one or more members selected from a group consisting of straw powders, wood sawdust and bamboo sawdust the adhesives are one or more members selected from a group consisting of phenolic-resin adhesives, epoxy resin adhesives, isocyanate adhesives and polyvinyl alcohol adhesives;

(S2) pressing and forming a panel, which comprises:

(S2-1) pre-pressing after feeding the stirred raw material in the step (S1) into a forming station, obtaining a matt, and sending the obtained matt into a press, and then pressing and forming the panel; or (S2-2) feeding the blended raw material in the step (S1) into an extruder, and then extruding and forming the panel; or (S2-3) heating and banbury blending after feeding the blended raw material in the step (S1) into an internal mixer, and then into a calender to press and form the panel; and (S3) edge-trimming after pulling out multiple formed panels manufactured in step (S2), and then stacking, cooling and keeping the multiple formed panels in good shape, wherein:

in the step (S1), a preparation method of the waste prepreg powders comprises: crushing and grinding recycled scraps from prepreg production, and then extracting metals to obtain the waste prepreg powders; a preparation method of the powders from waste printed circuit boards (PCBs) comprises: crushing and grinding scraps from printed circuit boards (PCBs) and recycled printed circuit boards (PCBs), and then extracting metals to get the powders; a preparation method of waste powders from epoxy plastic products or phenolic plastic products comprises: crushing and grinding recycled epoxy plastic products or phenolic plastic products, and scraps from production of epoxy plastic products or phenolic plastic products, and then extracting metals to obtain waste powders;

the step (S2-1) is an operation of feeding the obtained matt into the press, and then pressing and forming the panel which is specifically as follows:

through the carrier of steel, aluminum or epoxy resin plate, feeding the obtained matt into the hot press for pressurizing, which is circularly heated by the heat transfer oil, maintaining the heating temperature between 100° C. and 250° C.; with the press synchronously closing and pressurizing for 0.5 to one minute; pausing for one to three minutes; and secondarily pressing twice for 4 minutes to 90 minutes, then exhausting and relieving pressure.

4. The forming method of the composite epoxy resin board, as recited in claim 3, further comprises a step (S4) of sanding, inspecting, cleaning and storing the panels after step (S3) which involves edge-trimming after pulling out the formed panels, then stacking, cooling and keeping the panels in good shape.

5. A composite epoxy resin floor or decorative board comprising:

a veneer layer, a first adhesive layer, an inner core, a second adhesive layer and a cover layer, wherein:

the veneer layer is adhered to a top surface of the inner core, and is selected from a group consisting of wood veneer, melamine paper or HPL, stone veneer, tile veneer, rubber, decorative plastic veneer, linoleum veneer and decorative vinyl veneer;

the first adhesive layer is adapted for bonding the veneer layer to the top surface of the inner core, and is selected from PU adhesive, epoxy resin, a hot melt adhesive, and a water-resistant adhesive;

the inner core is a composite epoxy resin board made from a raw material comprising following components by weight: 5% to 95% waste prepreg powders, 1% to 95% powders from waste printed circuit boards (PCBs), 1% to 90% powders from waste epoxy plastic products or phenolic plastic products, 0% to 80% stone powders, 0% to 45% PVC powders and/or PE powders and/or HDPE powders, 0% to 20% copper powders, 0% to 20% aluminum powders, 0% to 5% color pigments, 0% to 80% straw, bamboo and wood powders, 0% to 20% chemical fiber powders, 0% to 80% calcium carbonate powders, 0% to 20% adhesives, 0% to 1% antioxidants, 0% to 1% reinforcing agents, 0% to 1% carbide stabilizers, and 0% to 5% coupling agents, and a sum of which is 100%;

the stone powders are made from wastes produced from marble mining or processing;

the straw, bamboo and wood powders are one or more members selected from a group consisting of straw powders, wood sawdust and bamboo sawdust;

the adhesives are one or more members selected from a group consisting of phenolic-resin adhesives, epoxy resin adhesives, isocyanate adhesives and polyvinyl alcohol adhesives;

the second adhesive layer is adapted for bonding an underlayer to a bottom surface of the inner core, the second adhesive is selected from the PU adhesive, the epoxy resin, the hot melt adhesive, and the water-resistant adhesive; the underlayer is selected from a group consisting of cork, rubber, foam and balance paper;

the cover layer is further laminated over the veneer layer, and the cover layer is selected from a group consisting of melamine resin with aluminum oxide and polyurethane, vinyl and UV coating.

6. The composite epoxy resin board, as recited in claim 5, wherein the inner core is a composite epoxy resin board made from the raw material which comprises the following components by weight: 5% to 80% waste prepreg powders, 1% to 70% powders from waste printed circuit boards (PCBs), 1% to 70% powders from waste epoxy plastic products or phenolic plastic products, 1% to 50% stone powders, 1% to 45% PVC powders and/or PE powders and/or HDPE powders, 0.01% to 1% copper powders, 0.01% to 1% aluminum powders, 0.01% to 1% color pigments, 1% to 40% straw, bamboo and wood powders, 1% to 20% chemical fiber powders, 1% to 10% calcium carbonate powders, 1% to 10% adhesives, 0% to 1% antioxidants, 0% to 1% reinforcing agents, 0% to 1% carbide stabilizers, and 0% to 1% coupling agents, and a sum of which is 100%.

* * * * *